United States Patent
Arai et al.

(10) Patent No.: US 6,276,316 B1
(45) Date of Patent: Aug. 21, 2001

(54) INTAKE-AIR QUANTITY CONTROL APPARATUS FOR INTERNAL COMBUSTION ENGINE WITH VARIABLE VALVE TIMING SYSTEM

(75) Inventors: Masahiro Arai; Hatsuo Nagaishi, both of Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/442,031

(22) Filed: Nov. 17, 1999

(30) Foreign Application Priority Data

Nov. 18, 1998 (JP) .................................................. 10-327852

(51) Int. Cl.$^7$ ........................................................ F01L 9/04
(52) U.S. Cl. ................................... 123/90.11; 123/90.15; 123/316; 123/405
(58) Field of Search ........................ 123/90.11, 90.15, 123/90.16, 90.17, 184.54, 316, 403, 405

(56) References Cited

U.S. PATENT DOCUMENTS

| | | | |
|---|---|---|---|
| 4,722,315 | * | 2/1988 | Pickel ................................. 123/568 |
| 4,794,890 | * | 1/1989 | Richeson, Jr. ..................... 123/90.11 |
| 5,228,422 | * | 7/1993 | Wakeman ............................ 123/432 |
| 5,765,513 | * | 6/1998 | Diehl et al. ....................... 123/90.11 |
| 5,826,551 | * | 10/1998 | Vuuren .............................. 123/90.12 |
| 6,062,201 | * | 5/2000 | Nozawa et al. ...................... 123/478 |

FOREIGN PATENT DOCUMENTS

| | | |
|---|---|---|
| 5-71370 | 3/1993 | (JP) . |
| 07317516 | 12/1995 | (JP) . |
| 08200025 | 8/1996 | (JP) . |

* cited by examiner

*Primary Examiner*—Weilun Lo
(74) *Attorney, Agent, or Firm*—Foley & Lardner

(57) ABSTRACT

An intake-air quantity control apparatus for an internal combustion engine with a variable valve timing system associated with an intake valve comprises an electronic control unit which controls an intake-air quantity of air entering an engine cylinder on the basis of an intake valve closure timing of the intake valve. The control unit includes a determination section which determines whether the intake valve should be closed during intake stroke or during compression stroke following the intake stroke, on the basis of engine operating conditions, a valve closure timing setting section which sets an intake valve closure timing on the intake stroke and an intake valve closure timing on the compression stroke, on the basis of the engine operating conditions, and a valve closure timing control section which closes the intake valve at either one of the intake valve closure timing on the intake stroke and the intake valve closure timing on the compression stroke, on the basis of a decision of the determination section.

37 Claims, 8 Drawing Sheets

OPENING TO AREA CONVERSION

TARGET BASIC VOLUMETRIC FLOW RATE

INTAKE-AIR QUANTITY CONTROL APPARATUS FOR INTERNAL COMBUSTION ENGINE WITH VARIABLE VALVE TIMING SYSTEM

BACKGROUND OF THE INVENTION

1. Field of the Invention

The present invention relates to the improvements of an intake-air quantity control apparatus for an internal combustion engine equipped with a variable valve timing system capable of electronically arbitrarily controlling an intake- and/or exhaust-valve timing, depending on operating condition of the engine/vehicle operating conditions.

2. Description of the Prior Art

In recent years, there have been proposed and developed various electronically-controlled variable valve timing systems which are capable of operating intake and exhaust valves electromagnetically or hydraulically. One such electronically-controlled variable valve timing system having electromagnetically-operated valve units has been disclosed in Japanese Patent Provisional Publication No. 8-200025. In the Japanese Patent Provisional Publication No. 8-200025, intake and exhaust valves are electronically arbitrarily controlled by means of an electromagnetic-solenoid valve controller, in place of a typical cam-drive mechanism. Japanese Patent Provisional Publication No. 7-317516 has disclosed an electronically-controlled, hydraulically-operated variable valve timing system having a pair of slidable plungers defining a pressure chamber therebetween, and an electromagnetic spill valve provided for each engine cylinder and fluidly connected to the pressure chamber for the purpose of working-fluid supply and working-fluid cut-off to the pressure chamber. The upper plunger is permanently pressed on the cam profile of a cam for producing reciprocating motion of the upper plunger during rotation of the cam, whereas the lower plunger is in abutted-engagement with the upper end of the valve stem. Thus, the motion of the cam is transmitted from the upper plunger via the working oil fed into the pressure chamber to the lower plunger. The working fluid in the pressure chamber can be exhausted therefrom via a flow-restricting orifice to cause a dampening effect. An intake valve closing point or an intake valve close timing (often abbreviated to "IVC"), an intake valve open timing point (often abbreviated to "IVO"), an exhaust valve closure timing (often abbreviated to "EVC"), and/or an exhaust valve open timing (often abbreviated to "EVO") can be adjusted by electronically controlling the activation and de-activation of the spill valve for each engine cylinder.

SUMMARY OF THE INVENTION

On internal combustion engines with an electronically-controlled variable valve timing system having electromagnetically-operated or hydraulically-operated valve units, it is possible to change the quantity of intake air entering an engine cylinder by varying an intake valve open timing (IVO) or an intake valve closure timing (IVC). For instance, assuming that the intake valve open timing (IVO) is set at or fixed to a predetermined crank angle, it is possible to control the quantity of intake air introduced into the engine cylinder by varying the intake valve closure timing (IVC). Alternatively, assuming that the intake valve close timing point (IVC) is set at or fixed to a predetermined crank angle, it is possible to control the quantity of intake air introduced into the engine cylinder by varying the intake valve open timing (IVO). Especially in controlling the intake-air quantity by means of an electromagnetically-operated intake valve unit, however, it is difficult to rapidly close the intake valve for a brief moment just after the intake valve is opened. That is to say, there is a possibility that the intake-air quantity cannot be adequately reduced to a small value required for during high speed and light load, or during vehicle deceleration, owing to operating characteristics of the electromagnetically-operated intake valve unit (containing an operating speed, and a minimum operating time period from valve open action to valve close action). The controllable band for engine output torque (engine power output) would be narrowed. In order to enhance one of the operating characteristics of the electromagnetic intake-port valve unit, that is, to shorten the minimum valve operating time period, the electromagnetic intake-port valve unit requires more electric power. This results in an increase in electric-power consumption. Also, an excessively short operating time period deteriorates the durability of the electromagnetic intake-port valve unit. The inventors of the present invention pay their attention to the fact that a volumetric capacity of an engine cylinder is same when a downstroke position of the piston on the intake stroke is identical to an upstroke position of the piston on the compression stroke. From the view point discussed above and to avoid the previously-described problems, the inventors of the invention discovers that, if the intake valve cannot be closed during an intake stroke due to the valve operating characteristics, it is desirable to close the intake valve during a compression stroke following the intake stroke.

Accordingly, it is an object of the invention to provide an intake-air quantity control apparatus for an internal combustion engine with a variable valve timing system which avoids the aforementioned disadvantages of the prior art.

It is another object of the invention to provide an intake-air quantity control apparatus for an internal combustion engine with a variable valve timing system which is capable of providing a required intake-air quantity without increasing electric power consumption, during high speed and light load, or during vehicle deceleration.

In order to accomplish the aforementioned and other objects of the present invention, an intake-air quantity control apparatus for an internal combustion engine with a variable valve timing system associated with an intake valve, comprises a control unit which controls an intake-air quantity of air entering an engine cylinder on the basis of an intake valve closure timing of the intake valve, the control unit comprising a determination section which determines whether the intake valve should be closed during an intake stroke or during a compression stroke following the intake stroke, on the basis of at least engine operating conditions, a valve closure timing setting section which sets an intake valve closure timing on the intake stroke and an intake valve closure timing on the compression stroke, on the basis of the engine operating conditions, and a valve closure timing control section which closes the intake valve at either one of the intake valve closure timing on the intake stroke and the intake valve closure timing on the compression stroke, on the basis of a decision of the determination section.

According to another aspect of the invention, an intake-air quantity control apparatus for an internal combustion engine with a variable valve timing system associated with an intake valve, comprises an intake-valve side actuator adjusting an opening of the intake valve, a control unit configured to be electronically connected to the intake-valve side actuator, for controlling the opening timing of the intake valve, and for controlling an intake-air quantity of air entering an engine cylinder on the basis of an intake valve closure timing of the intake valve, the control unit comprising a target intake-air quantity arithmetic-calculation section which calculates a target intake-air quantity on the basis of engine operating conditions including an accelerator opening and engine speed, an intake valve closure timing arithmetic-calculation section which calculates both an intake valve closure timing on an intake stroke and an intake valve closure timing on a compression stroke, on the basis of the target intake-air quantity and the engine speed of the engine operating conditions, a valve operating time period arithmetic-calculation section which calculates an operating time period of the intake valve from an intake valve open timing to an intake valve closure timing, on the basis of the engine speed of the engine operating conditions, a comparator which compares an intake-valve operating crank angle corresponding to the operating time period of the intake valve with an intake-valve operating crank angle corresponding to the target intake-air quantity, a valve-closure-timing selection section which selects the intake valve closure timing on the intake stroke when the intake-valve operating crank angle corresponding to the operating time period of the intake valve is less than the intake-valve operating crank angle corresponding to the target intake-air quantity, and selects the intake valve closure timing on the compression stroke following the intake stroke when the intake-valve operating crank angle corresponding to the operating time period of the intake valve is greater than or equal to the intake-valve operating crank angle corresponding to the target intake-air quantity, and a valve closure timing control section which outputs a control signal to the intake-valve side actuator to close the intake valve at the intake valve closure timing selected by the valve-closure-timing selection section.

According to a further aspect of the invention, in an electronically-controlled internal combustion engine with a variable valve timing system associated with an intake valve, and having an intake-valve side actuator adjusting an opening of the intake valve, an intake-air quantity control system configured to be electronically connected to the intake-valve side actuator, for controlling the opening timing of the intake valve and for controlling an intake-air quantity of air entering an engine cylinder on the basis of an intake valve closure timing of the intake valve, comprises a target intake-air quantity arithmetic-calculation means for calculating a target intake-air quantity on the basis of engine operating conditions including an accelerator opening and engine speed, an intake valve closure timing arithmetic-calculation means for calculating both an intake valve closure timing on an intake stroke and an intake valve closure timing on a compression stroke, on the basis of the target intake-air quantity and the engine speed of the engine operating conditions, a valve operating time period arithmetic-calculation means for calculating an operating time period of the intake valve from an intake valve open timing to an intake valve closure timing, on the basis of the engine speed of the engine operating conditions, a comparing means for comparing an intake-valve operating crank angle corresponding to the operating time period of the intake valve with an intake-valve operating crank angle corresponding to the target intake-air quantity, a valve-closure-timing selection means for selecting the intake valve closure timing on the intake stroke when the intake-valve operating crank angle corresponding to the operating time period of the intake valve is less than the intake-valve operating crank angle corresponding to the target intake-air quantity, and for selecting the intake valve closure timing on the compression stroke following the intake stroke when the intake-valve operating crank angle corresponding to the operating time period of the intake valve is greater than or equal to the intake-valve operating crank angle corresponding to the target intake-air quantity, and a valve closure timing control means for outputting a control signal to the intake-valve side actuator to close the intake valve at the intake valve closure timing selected by the valve-closure-timing selection means.

According to a still further aspect of the invention, a method for controlling an intake-air quantity of air entering an engine cylinder for a computer-controlled internal combustion engine with a variable valve timing system associated with an intake valve, and having an intake-valve side actuator adjusting an opening of the intake valve, and an intake-air quantity control system configured to be electronically connected to the intake-valve side actuator, for controlling the opening timing of the intake valve and for controlling the intake-air quantity of air entering the engine cylinder on the basis of an intake valve closure timing of the intake valve, the method comprises arithmetically calculating a target intake-air quantity on the basis of engine operating conditions including an accelerator opening and engine speed, arithmetically calculating both an intake valve closure timing on an intake stroke and an intake valve closure timing on a compression stroke, on the basis of the target intake-air quantity and the engine speed of the engine operating conditions, arithmetically calculating an operating time period of the intake valve from an intake valve open timing to an intake valve closure timing, on the basis of the engine speed of the engine operating conditions, comparing an intake-valve operating crank angle corresponding to the operating time period of the intake valve with an intake-valve operating crank angle corresponding to the target intake-air quantity, selecting the intake valve closure timing on the intake stroke when the intake-valve operating crank angle corresponding to the operating time period of the intake valve is less than the intake-valve operating crank angle corresponding to the target intake-air quantity, selecting the intake valve closure timing on the compression stroke following the intake stroke when the intake-valve operating crank angle corresponding to the operating time period of the intake valve is greater than or equal to the intake-valve operating crank angle corresponding to the target intake-air quantity, and outputting a control signal to the intake-valve side actuator to close the intake valve at the intake valve closure timing selected.

DESCRIPTION OF THE PREFERRED EMBODIMENTS

Figure 1:
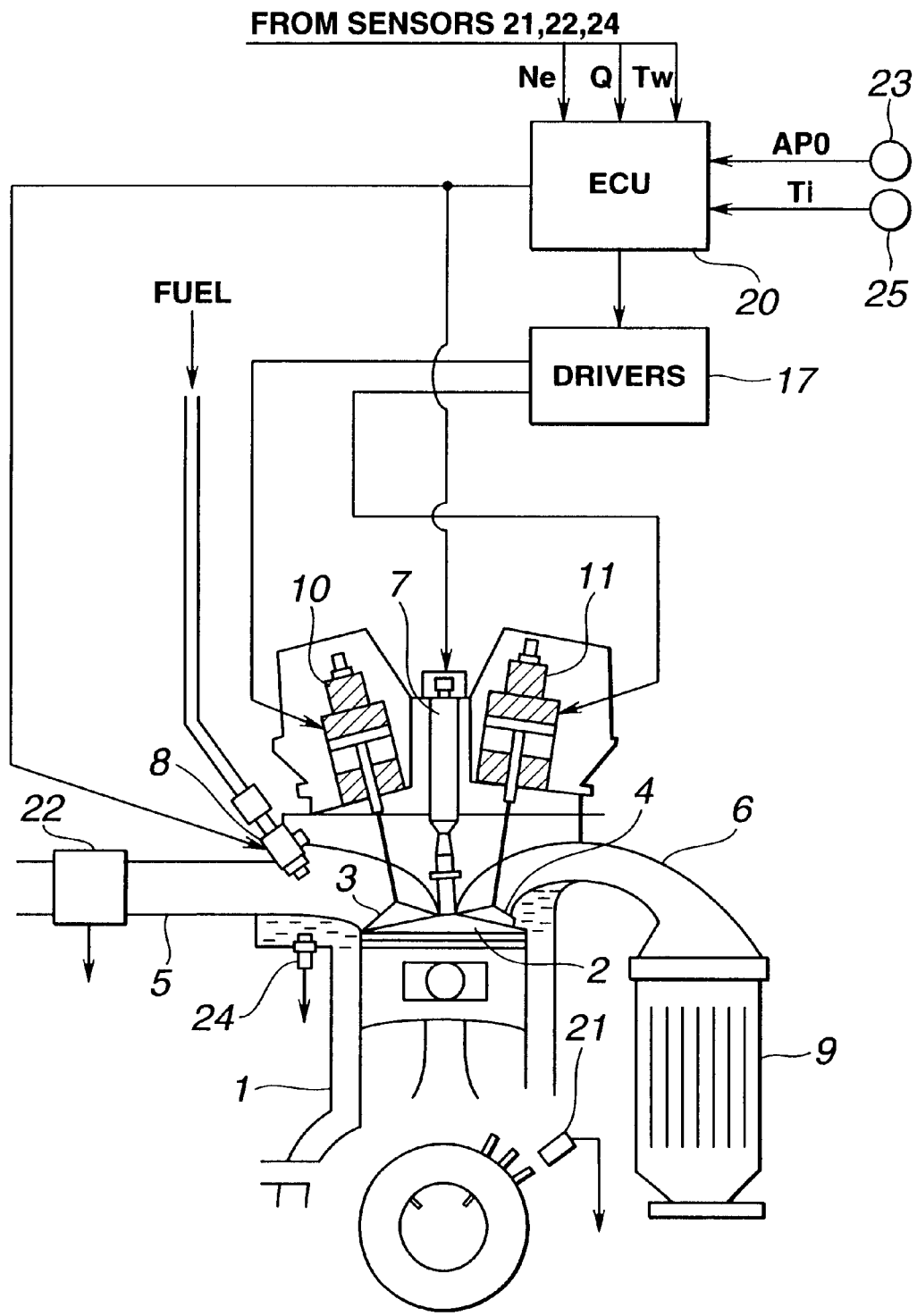
FIG. 1 is a system diagram illustrating one embodiment of an intake-air quantity control apparatus for an internal combustion engine with a variable valve timing system.
Figure 2:
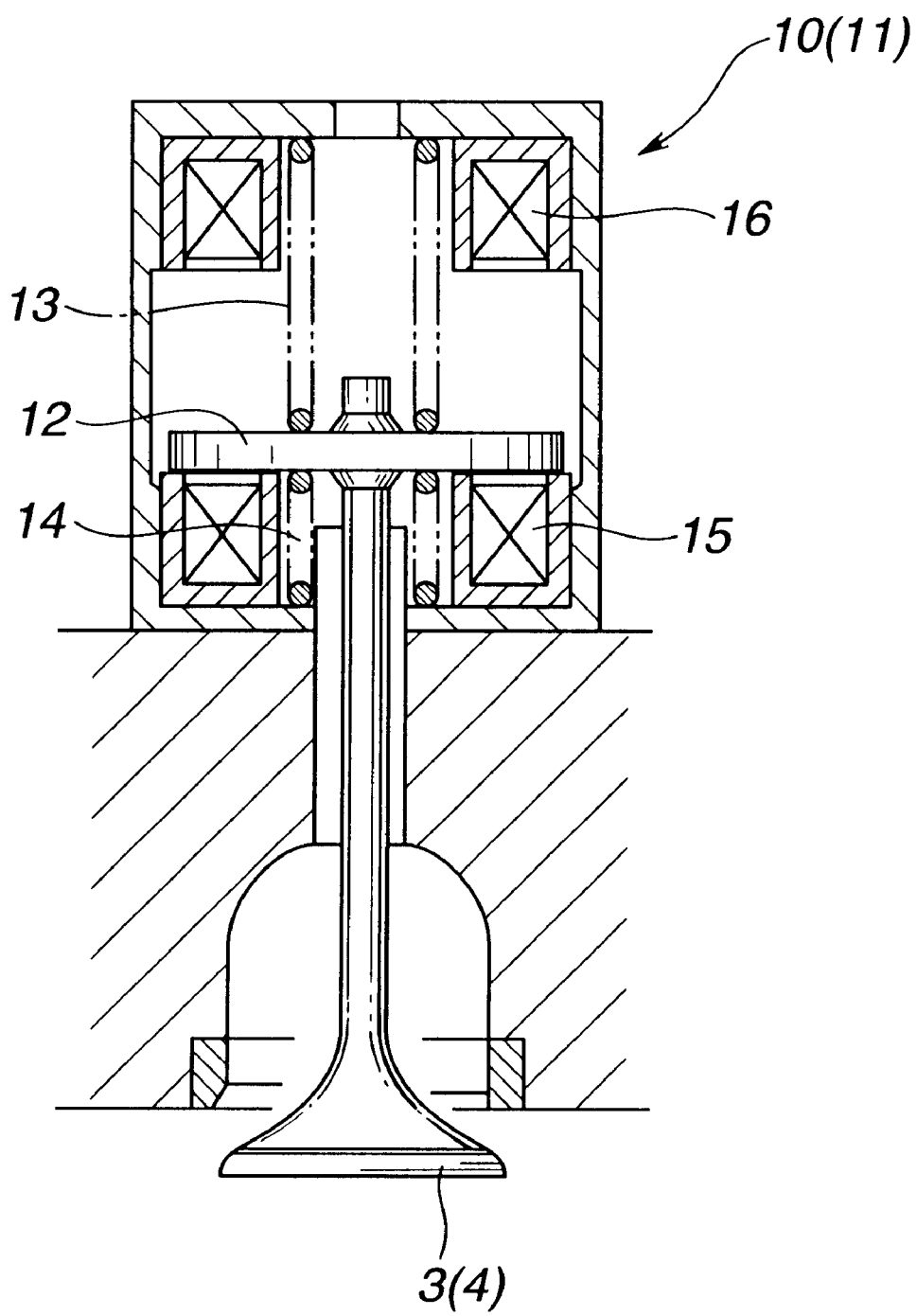
FIG. 2 is a cross section of an electromagnetically-operated engine valve unit employed in the intake-air quantity control apparatus of the embodiment.

Referring now to the drawings, particularly to FIG. 1, the intake-air quantity control system of the invention is exemplified in electromagnetically-powered valve operating units mounted on each engine cylinder of an in-line internal combustion engine. As clearly shown in FIG. 1, a cylinder head of the internal combustion engine 1 is formed with an intake-air port communicating an intake-air pipe or an intake manifold 5 and an exhaust port communicating an exhaust-gas pipe or an exhaust manifold 6. An electromagnetically-powered intake valve 3 is located in the cylinder head for opening and closing the intake port, whereas an electromagnetically-powered exhaust valve 4 is located in the cylinder head for opening and closing the exhaust port. In FIG. 1, reference sign 2 denotes an engine cylinder (or a combustion chamber), reference sign 7 denotes a spark plug, reference sign 8 denotes a fuel injection valve or a fuel injector, and reference sign 9 denotes a catalytic converter of an exhaust emission control device. As seen in FIG. 1, the valve operating units of the embodiment includes an intake-valve side electromagnetic actuator 10 electromagnetically opening and closing the intake valve 3 and an exhaust-valve side electromagnetic actuator 11 electromagnetically opening and closing the exhaust valve 4. As shown in FIG. 2, each of the two electromagnetic actuators 10 and 11 is comprised of an axially movable disc-like plunger 12 fixedly connected to the upper end of the valve stem, an upper coil spring 13 permanently biasing the movable plunger 12 in a direction opening the associated valve, a lower coil spring 14 permanently biasing the movable plunger 12 in a direction closing the associated valve, and lower and upper electromagnetic coils 15 and 16 arranged coaxially around the valve stem (or with respect to the axis of the movable plunger 12). In the shown embodiment, each of the upper and lower coil springs 13 and 14 is a coiled helical compression spring. In more detail, the upper end of the upper coil spring 13 is retained by the inner peripheral wall of the top flatten portion of an actuator housing (not numbered), while the lower end of the upper coil spring 13 is seated on the upper face of the disc-like plunger 12. On the other hand, the upper end of the lower coil spring 14 is seated on the lower face of the disc-like plunger 12, whereas the lower end of the lower coil spring 14 is retained by the inner peripheral wall of the bottom flatten portion of the actuator housing. During operation of the electromagnetic actuator, when the lower electromagnetic coil 15 is activated, the plunger 12 is attracted downwards by way of attraction force (electromagnetic force) created by the coil 15 energized, and as a result the associated valve is opened (see the state shown in FIG. 2). Under the condition shown in FIG. 2, when electric-current supply to the lower coil 15 is blocked by means of a driver (or a driving circuit) 17, the movable plunger 12 passes through its neutral position by virtue of spring bias of the lower spring 14 and then approaches to the upper coil 16. At the same time, when the upper coil 16 is activated, the plunger 12 is attracted towards the upper coil 16 against the spring bias of the upper spring 13 by way of attraction force. In this manner, the valve is shifted from the valve open state to the valve closed state. Under such a valve closed state, when the electric-current supply to the upper coil 16 is blocked by means of the driver 17, the plunger 12 passes through the neutral position by virtue of spring bias of the upper spring 13 and then approaches to the lower coil 15. At this time, when the lower coil 15 is activated, the plunger 12 is attracted downwards against the spring bias of the lower spring 14 by way of attraction force. In this manner, the valve is opened again. In an in-active state of the electromagnetic actuator, that is, when the lower and upper electromagnetic coils 15 and 16 are both de-energized, the movable plunger 12 is held in the neutral position at which a spring load created by the upper spring 13 is balanced to a spring load created by the lower spring 14 and the attracted face of the plunger 12 is spaced from the associated attracting face of the electromagnet (either one of the electromagnetic coils 16 and 15) by a predetermined distance. The previously-discussed electromagnetic-valve-actuator driver 17 is controlled by a control signal from an electronic engine control unit (ECU) 20, in order to control activation and deactivation of the respective electromagnetic coils 15 and 16, constructing part of the actuator (10, 11). In a conventional manner, the control unit 20 comprises a microcomputer generally constructed by a central processing unit (CPU), an input/output interface, and a computer memory. As seen in FIG. 1, the input interface of the control unit 20 receives various sensor signals from engine-vehicle sensors, namely a crank angle sensor or a crankshaft position sensor 21, an intake-air quantity sensor 22, an accelerator opening sensor or an accelerator-pedal position sensor 23, an engine temperature sensor (an engine coolant temperature sensor), an intake-air temperature sensor, and the like. The crank angle sensor 21 is provided usually located at the front end of the engine, to inform the input interface of the ECU 20 of the engine speed Ne as well as the relative position of the crankshaft, that is, a crank angle. The intake-air quantity sensor 22 is located in the intake-air pipe of the induction system, to detect or measure an intake-air quantity Q (an actual quantity of fresh air flowing into engine cylinders). A hot-wire mass air flow meter is commonly used as an air quantity sensor. The accelerator opening sensor 23 is located near the accelerator, for monitoring an opening APO of the accelerator (the amount of depression of the accelerator pedal). Usually, a coolant temperature sensor is used as an engine temperature sensor 24. The coolant temperature sensor is located on the engine and usually screwed into one of top coolant passages to sense the actual operating temperature of the engine, that is, the engine coolant temperature Tw. The intake-air temperature sensor 25 is mounted on the intake-air pipe (the intake manifold) 5, and usually treaded into the intake manifold to monitor and to react the air temperature Ti within the intake-air pipe or the intake manifold. The air temperature sensor 25 is useful to detect changes in air density of airflow through the intake-air pipe 5. The CPU of the control unit 20 retrieves an intake valve open timing (IVO), an intake valve closure timing (IVC), an exhaust valve open timing (EVO), and an exhaust valve closure timing (EVC) from respective preprogrammed characteristic maps (IVO, IVC, EVO, and EVC characteristic map data) stored in the computer memory, on the basis of the accelerator opening APO, the engine speed Ne, and the like. The output interface of the control unit 20 outputs the control signal based on the data retrieved from the map data to the electromagnetic-valve-actuator driver 17, to control energization and de-energization of each of the electromagnetic coils 15 and 16 of the actuator (10, 11).

Figure 3:
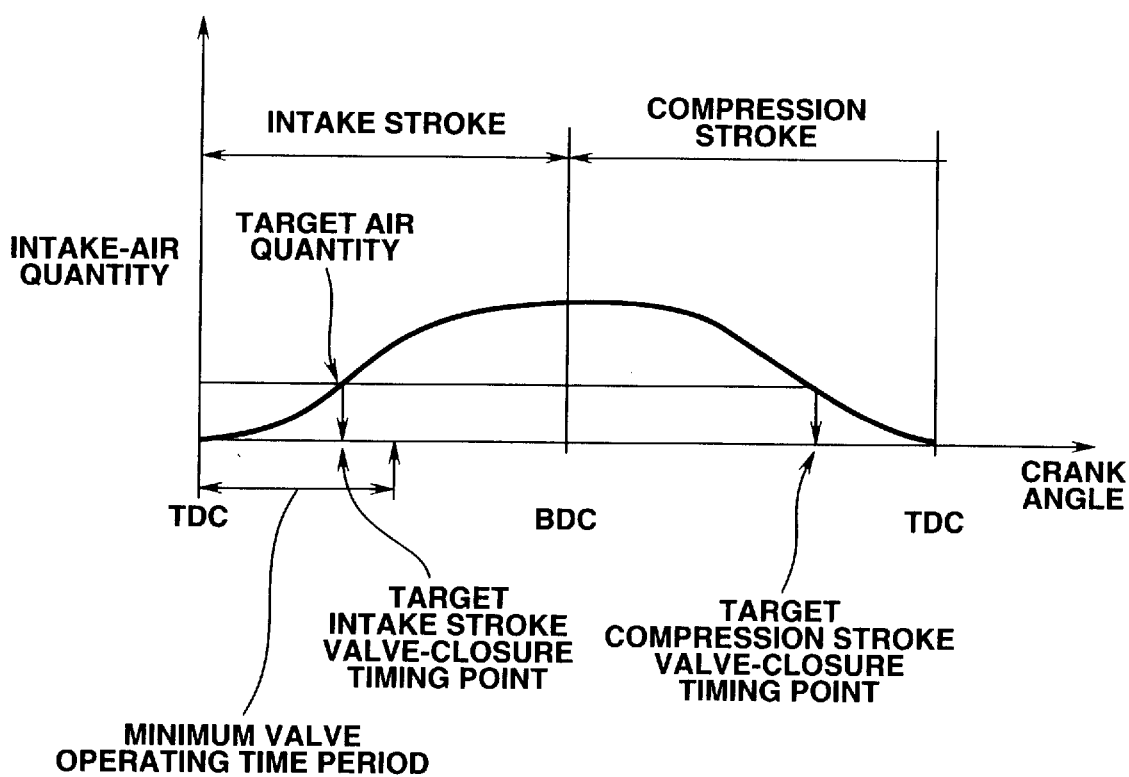
FIG. 3 is a characteristic diagram illustrating the relationship between an intake-air quantity and a crank angle under a particular condition where an intake valve is opened at the beginning of the intake stroke and closed nearby the end of the compression stroke.

According to the preprogrammed IVO characteristic map, the opening timing (IVO) of the intake valve 3 is determined or set to vary in a timing-advance direction from the top dead center (TDC) on intake stroke, serving as a reference point, as the engine speed Ne increases. On the other hand, the closing timing (IVC) of the intake valve 3 is determined or set at a timing suitable to obtain a required intake-air quantity or a desired air quantity, that is, a desired engine output torque, mainly based on the accelerator opening APO and the engine speed Ne. In the shown embodiment, note that an intake-valve closure timing (IVC) on an intake stroke is determined or set as a primary IVC, and additionally an intake-valve closure timing (IVC) on a compression stroke is determined or set as a secondary IVC, as described in detail hereunder. As described previously, the inventors of the invention pay their attention to the fact that a volumetric capacity of an engine cylinder is same when a downstroke position of the piston on an intake stroke is identical to an upstroke position of the piston on a compression stroke. As can be appreciated from the intake-air quantity versus crank angle characteristic diagram of FIG. 3, when the intake valve 3 remains open over the two piston strokes of intake and compression, there are a pair of crossing points with respect to a horizontal line representative of a required intake-air quantity or a target intake-air quantity, so that a certain piston downstroke position (or a target intake-air quantity within the intake stroke) is identical to a certain piston upstroke position (or a target intake-air quantity within the compression stroke). As seen in FIG. 3, if the target air quantity is comparatively small, and a period of time from the beginning (IVO) of the intake stroke to a target intake valve closure timing point (IVC) on the intake stroke is shorter than the minimum valve operating time period of operating characteristics of the electromagnetic valve actuator (10, 11), there is a possibility that the intake valve 3 cannot be closed at the set target intake valve closure timing point on the intake stroke during the current four-stroke cycle. In such a case, according to the intake-air quantity control apparatus of the embodiment, in lieu of the primary IVC (the intake valve closure timing on the intake stroke), the aforementioned secondary IVC (the intake valve closure timing on the compression stroke following the intake stroke) is selected (see the two crossing points, indicated as a target intake stroke valve-closure timing point and a target compression stroke valve-closure timing point in FIG. 3). Switching between the primary and secondary intake-valve closure timings is performed by means of the CPU of the control unit 20, in accordance with the IVC selection routine of FIG. 7, which will be fully described later.

Figure 4:
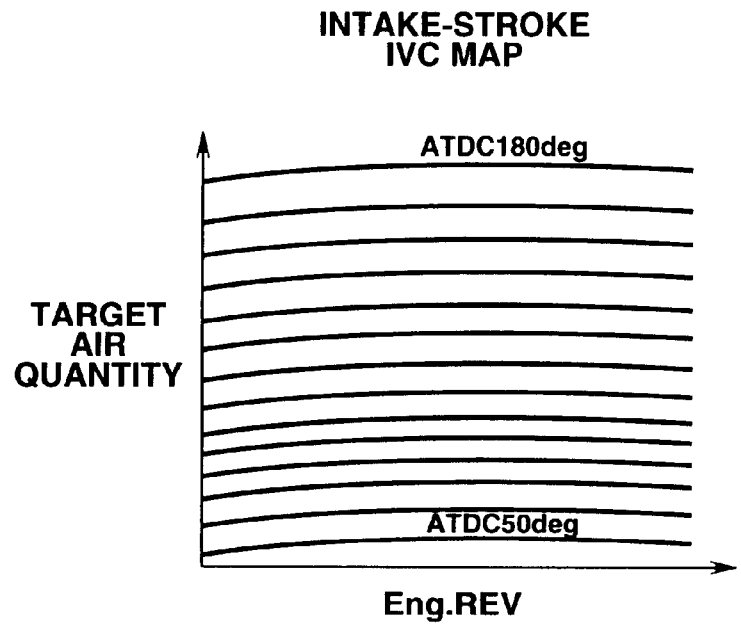
FIG. 4 is an intake valve closure timing (IVC) map illustrating the relationship among a target intake-air quantity (a target air quantity), engine speed, and an intake air closure timing on the intake stroke.
Figure 5:
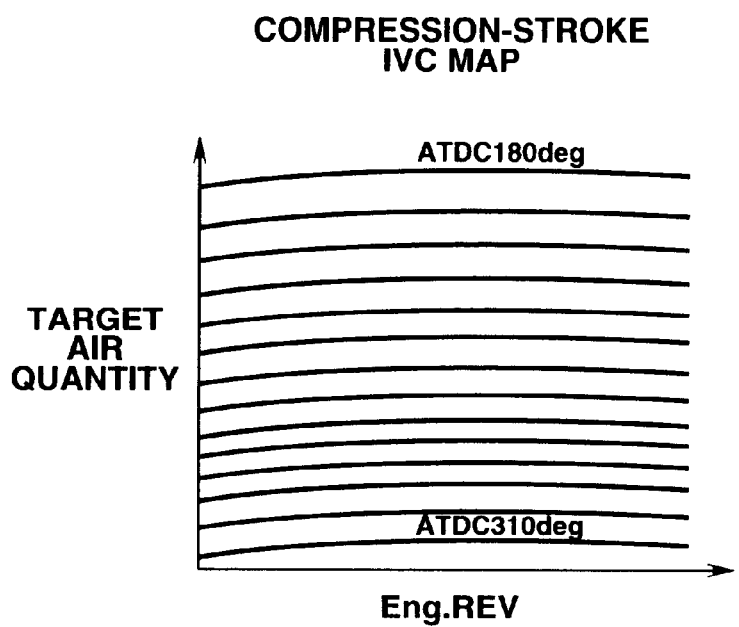
FIG. 5 is an intake valve closure timing (IVC) map illustrating the relationship among a target air quantity, engine speed, and an intake air closure timing on the compression stroke.

FIG. 4 shows a preprogrammed or predetermined IVC characteristic map on intake stroke, whereas FIG. 5 shows a preprogrammed or predetermined IVC characteristic map on compression stroke. Each of the intake-stroke IVC map and the compression-stroke IVC map is determined or set on the basis of the top dead center (TDC) on the intake stroke or the opening timing IVO of the intake valve 3, functioning as a reference point of the IVC. The intake valve opening timing IVO is used as the reference point of the IVC, only when the intake valve open timing IVO is later than the TDC on the intake stroke. In the intake-stroke IVC characteristic map of FIG. 4, the intake valve closure timing on the intake stroke is set, so that the intake valve 3 begins to open at 50 degrees after TDC on the intake stroke (ATDC 50 degrees) when the target intake-air quantity is very low (see the lowermost characteristic curve of FIG. 4), and so that the intake valve 3 begins to open at 180 degrees after TDC on the intake stroke (ATDC 180 degrees) when the target intake-air quantity is very high (see the uppermost characteristic curve of FIG. 4). Twelve intermediate characteristic curves between the lowermost (ATDC 50 degrees) and uppermost (ATDC 180 degrees) characteristic curves respectively indicate ATDC 60 degrees, ATDC 70 degrees, ATDC 80 degrees, ATDC 90 degrees, ATDC 100 degrees, ATDC 110 degrees, ATDC 120 degrees, ATDC 130 degrees, ATDC 140 degrees, ATDC 150 degrees, ATDC 160 degrees, and ATDC 170 degrees, from the second lowest characteristic curve and upwards. On the other hand, in the compression-stroke IVC characteristic map of FIG. 5, the intake valve closure timing on the compression stroke is set, so that the intake valve 3 begins to open at 180 degrees after TDC on the compression stroke (ATDC 180 degrees) when the target intake-air quantity is very high (see the uppermost characteristic curve of FIG. 5), and so that the intake valve 3 begins to open at 310 degrees after TDC on the intake stroke (ATDC 310 degrees) when the target intake-air quantity is very low (see the lowermost characteristic curve of FIG. 5). Twelve intermediate characteristic curves between the uppermost (ATDC 180 degrees) and lowermost (ATDC 310 degrees) characteristic curves respectively indicate ATDC 190 degrees, ATDC 200 degrees, ATDC 210 degrees, ATDC 220 degrees, ATDC 230 degrees, ATDC 240 degrees, ATDC 250 degrees, ATDC 260 degrees, ATDC 270 degrees, ATDC 280 degrees, ATDC 290 degrees, and ATDC 300 degrees, from the second highest characteristic curve and downwards. Also, the opening timing (EVO) of the exhaust valve 4 is determined or set nearby bottom dead center (BDC) of the piston substantially midway between the end of expansion stroke and the beginning of exhaust stroke. Furthermore, the closing timing (EVC) of the exhaust valve 4 is determined or set to vary in a timing-retard direction from the top dead center (TDC) on the intake stroke, serving as a reference point. A basic fuel-injection amount of fuel injected by the fuel injector 8 is generally determined on the basis of both the intake-air quantity Q sensed by the intake-air quantity sensor 22 and the engine speed Ne sensed by the crank angle sensor 21. As is generally known, the basic fuel-injection amount is compensated for or corrected depending on the coolant temperature Tw, the intake-air temperature Ti, and the like, and the corrected fuel-injection amount is usually used in an electronic fuel injection system.

Details of the intake valve closure timing (IVC) control performed by the intake-air quantity control apparatus of the embodiment are hereinafter described in accordance with the flow charts shown in FIGS. 6 and 7.

Figure 6:
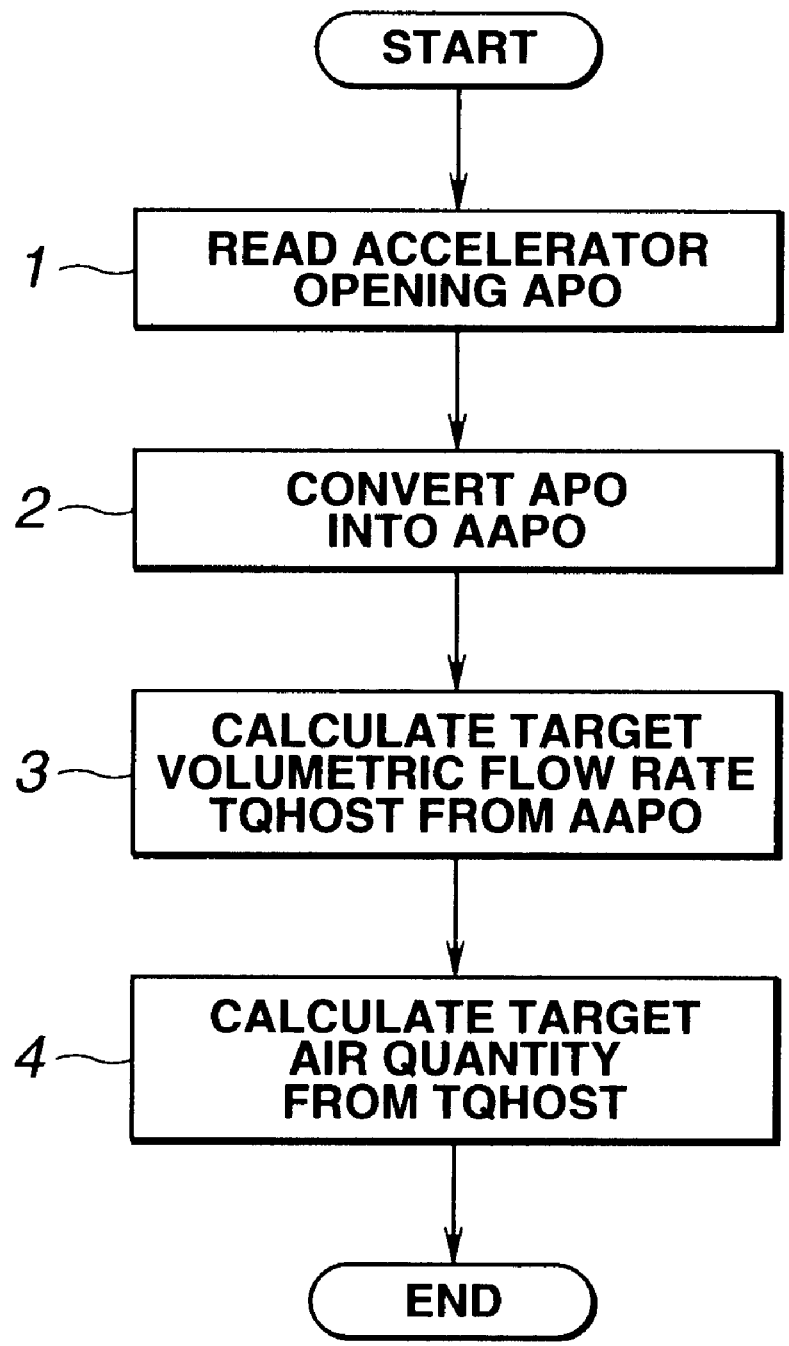
FIG. 6 is a flow chart illustrating an arithmetic-calculation routine for the target air quantity.
Figure 8:
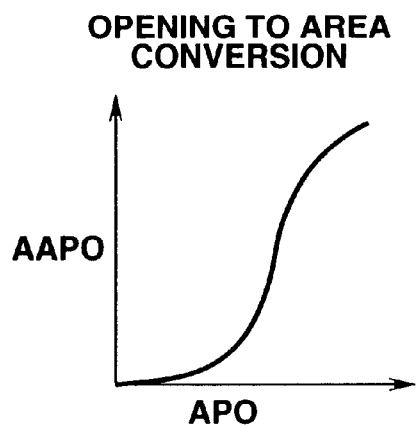
FIG. 8 is a characteristic map for conversion from an accelerator opening (APO) into a throttle-opening area (AAPO).
Figure 9:
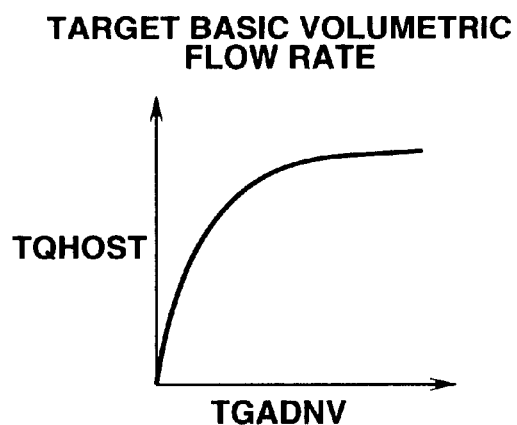
FIG. 9 is a characteristic map for conversion from a normalized opening area (TGADNV) into a target basic volumetric flow rate (TQHOST).
Figure 10:
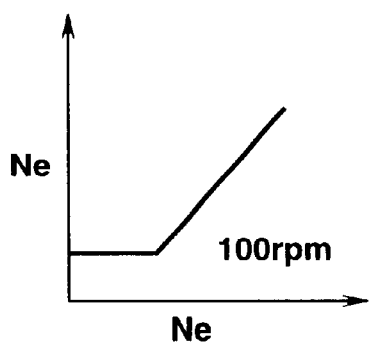
FIG. 10 is a characteristic map for setting a lower limit (e.g., 100 rpm) for the engine speed (Ne).

Referring now to FIG. 6, there is shown the arithmetic-calculation routine for the target intake-air quantity. In step 1, the accelerator opening APO sensed by the accelerator opening sensor 21 is read. In step 2, a throttle-opening area AAPO corresponding to the accelerator opening APO obtained through step 1 is computed. In the shown embodiment, the throttle-opening area AAPO is arithmetically calculated or retrieved from the accelerator opening (APO) to throttle-opening area (AAPO) conversion characteristic shown in FIG. 8, on the basis of the accelerator opening APO. On later model cars, the intake-air quantity could be by properly controlling or managing an intake valve timing in place of throttle-opening adjustment. In this case, a throttle valve is not mounted on the engine. Alternatively, a throttle valve is installed on the engine only for the purpose of generation of negative pressure in an intake-air pipe. In an internal combustion engine without any throttle valve, an equivalent throttle-opening area (AAPO) may be derived through step 2 on the basis of the accelerator opening APO. In step 3, a normalized opening area TGADNV is arithmetically calculated by dividing the throttle-opening area AAPO by both the engine speed Ne and a displacement VOL of the engine. Additionally, in step 3, a target basic volumetric flow rate (a target volumetric flow rate) TQHOST is arithmetically calculated on the basis of the above-mentioned normalized opening area TGADNV. Actually, the target volumetric flow rate TQHOST can be retrieved from a predetermined or preprogrammed unit-conversion characteristic map shown in FIG. 9. However, if the engine speed is excessively low (for example, less than 100 rpm), as shown in FIG. 10, the engine speed Ne is set at a predetermined lower limit such as 100 rpm, and thus the normalized opening area TGADNV is computed on the basis of the engine speed Ne set at the predetermined lower limit. In step 4, the target intake-air quantity is arithmetically calculated by multiplying the calculated target volumetric flow rate TQHOST with the maximum intake-air quantity based on the engine-speed indicative informational data Ne sent to the ECU 20 at the current arithmetic-calculation cycle.

Figure 7:
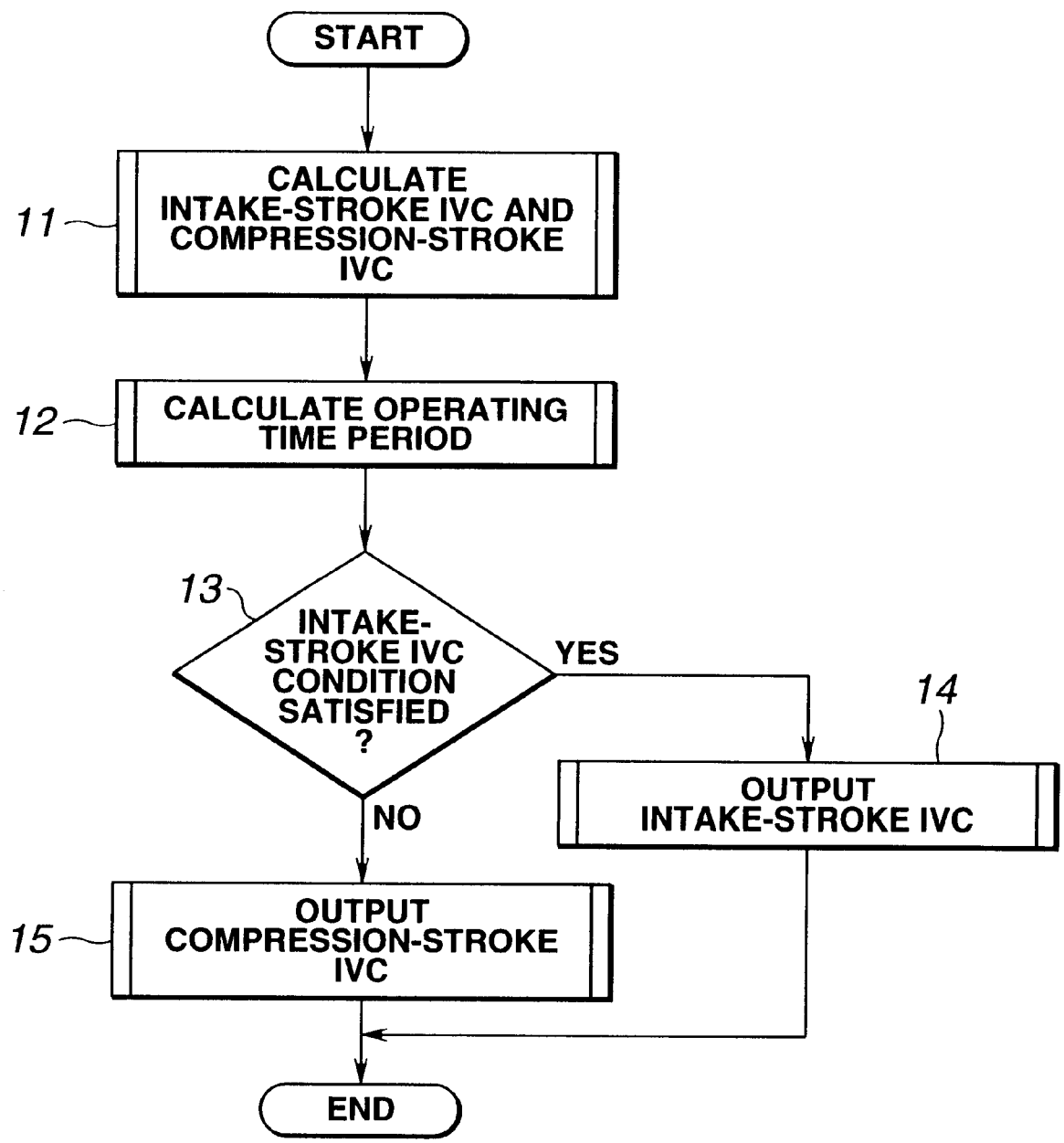
FIG. 7 is a flow chart illustrating an IVC selection routine between a preprogrammed IVC on the intake stroke and a preprogrammed IVC on the compression stroke.

Referring now to FIG. 7, there is shown the IVC selection routine used for making a selection of the best intake valve closure timing (IVC) from a preprogrammed intake valve closure timing (IVC) on the intake stroke and a preprogrammed intake valve closure timing (IVC) on the compression stroke.

In step 11, an IVC on the intake stroke and an IVC on the compression stroke are respectively retrieved from the preprogrammed IVC characteristic map on intake stroke shown in FIG. 4 and the preprogrammed IVC characteristic map on compression stroke shown in FIG. 5, on the basis of the engine speed Ne and the target intake-air quantity calculated through step 4 of FIG. 6. An operating time period (an operating crank angle) of the intake valve 3 varies depending on the engine speed Ne. Thus, in step 12, the operating time period of the intake valve 3 from the intake-valve open timing point (IVO) to the intake-valve closure timing point (IVC) is determined or arithmetically calculated on the basis of the engine speed Ne. In step 13, on the basis of at least three operating conditions, namely the engine speed Ne, the accelerator opening APO, and the intake-valve operating time period calculated in step 12, a check is made to determine whether an intake-stroke IVC condition is satisfied, that is, whether the intake valve closure timing (IVC) on the intake stroke should be selected rather than the intake valve closure timing (IVC) on the compression stroke. More precisely, in step 13, the intake-valve operating crank angle corresponding to the intake-valve operating time period calculated in step 12 is compared with an intake-valve operating crank angle corresponding to the target intake-air quantity calculated through a series of steps of FIG. 6. Then, a test is made to determine whether the intake valve 3 can be certainly closed during the intake stroke in the current four-stroke cycle under the current engine/vehicle operating conditions, namely the current engine speed Ne, the current accelerator opening APO, and the valve operating time period calculated in the current routine. Actually, the arithmetically-calculated intake-valve operating time period based on the engine speed Ne (or the intake-valve operating crank angle calculated in step 12 of FIG. 7) is compared with an intake-valve crank angle corresponding to the target intake-air quantity derived through step 4 of FIG. 6. When the intake-valve operating crank angle calculated in step 12 is less than the intake-valve crank angle corresponding to the target intake-air quantity derived through step 4 of FIG. 6, the CPU of the control unit 20 determines that it is possible to certainly close the intake valve 3 during the intake stroke in the current four-stroke cycle. Thereafter, the control routine flows from step 13 to step 14. In step 14, the output interface of the control unit 20 outputs a control command representative of the intake valve closure timing (IVC) on the intake stroke to the electromagnetic-valve-actuator driver 17 associated with the intake-valve side electromagnetic actuator 10, so as to close the intake valve 3 at the intake valve closure timing (IVC) on the intake stroke. Conversely, when the intake-valve operating crank angle (the minimum valve operating time period) calculated in step 12 is greater than or equal to the intake-valve crank angle corresponding to the target intake-air quantity derived through step 4 of FIG. 6, the CPU of the control unit 20 determines that it is impossible to certainly close the intake valve 3 during the intake stroke in the current four-stroke cycle and that it is suitable to close the intake valve 3 during the compression stroke following the intake stroke in the current four-stroke cycle. After this, step 15 occurs. In step 15, the output interface of the control unit 20 outputs a control command representative of the intake valve closure timing (IVC) on the compression stroke to the electromagnetic-valve-actuator driver 17 associated with the intake-valve side electromagnetic actuator 10, so as to close the intake valve 3 at the intake valve closure timing (IVC) on the compression stroke.

As discussed above, if it is impossible to close the intake valve 3 during the intake stroke of a certain four-stroke cycle owing to the operating characteristics of the intake valve 3, especially the valve operating time period, it is possible to obtain an air quantity substantially corresponding to the target intake-air quantity by closing the intake valve 3 at the compression stroke following the intake stroke in the same four-stroke cycle. According to the intake-air quantity control apparatus of the embodiment, it is possible to accurately, timely, and effectively control the quantity of intake air entering each engine cylinder, while reducing the delay of the intake valve closure timing to the minimum. Particularly, even during high speed and light load, or during vehicle deceleration, the intake-air quantity control apparatus can satisfactorily reduce the intake-air quantity to a required or desired small value. This widens a controllable engine-output-torque band. Furthermore, according to the intake-air quantity control apparatus of the invention, it is possible to increase the durability of the intake valve 3 without increasing electric power consumed to drive the intake valve 3.

Figure 11:
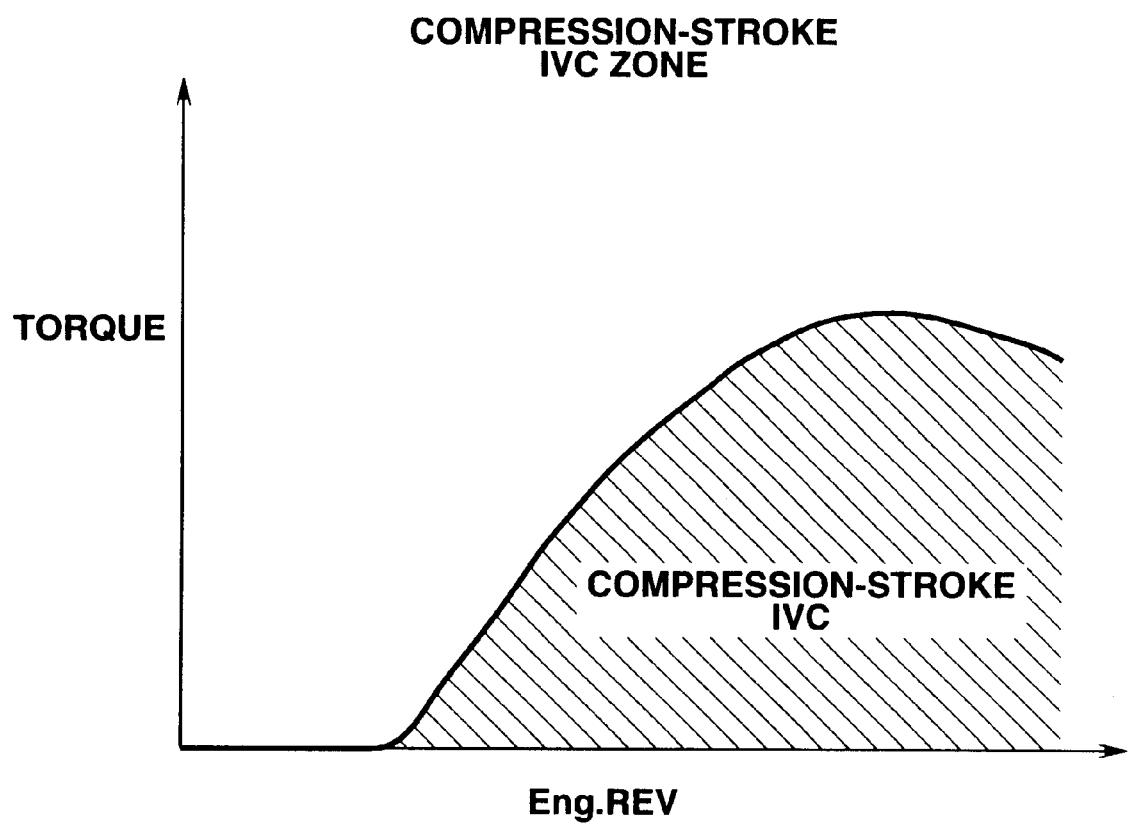
FIG. 11 is a characteristic map illustrating a compression-stroke IVC zone based on engine speed and engine output torque.

In the previously-described embodiment, an intake-valve operating crank angle based on engine speed is compared with an intake-valve operating crank angle corresponding to a target intake-air quantity obtained through a series of arithmetic calculations (see the flow of FIG. 6), for selection of the best valve closure timing from the intake valve closure timing (IVC) on the intake stroke and the intake valve closure timing (IVC) on the compression stroke. Alternatively, the intake valve closure timing (IVC) on the compression stroke may be selected by reference to a preprogrammed or predetermined compression-stroke IVC zone representative two-dimensional characteristic map (see FIG. 11), accounting for engine output torque as well as engine speed. In the two-dimensional characteristic map of FIG. 11, the hatched zone indicates the compression-stroke IVC zone where the intake valve 3 is closed at a preprogrammed or preset valve closure timing on the compression stroke, whereas the non-hatched zone indicates the intake-stroke IVC zone where the intake valve 3 is closed at a preprogrammed or preset valve closure timing on the intake stroke.

The entire contents of Japanese Patent Application No. P10-327852 (filed Nov. 18, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake-air quantity control apparatus for an internal combustion engine, comprising:
    an intake-valve actuator that actuates an intake valve; and
    a control unit configured to be electronically connected to the intake-valve actuator, the control unit comprising
        a first section that calculates a target intake air quantity on the basis of an engine operating condition,
        a second section that calculates both an intake valve closure timing on an intake stroke and an intake valve closure timing on a compression stroke on the basis of the target intake-air quantity,
        a third section that calculates a crank angle corresponding to a minimum valve operating time period of the actuator from an intake valve open timing to an intake valve closure timing on the basis of an engine speed,
        a fourth section that compares the crank angle corresponding to the minimum valve operating time period of the actuator with a crank angle corresponding to the target intake air quantity from an intake valve open timing to an intake valve closure timing on the intake stroke,
        a fifth section that selects the intake valve closure timing on the intake stroke when the crank angle corresponding to the minimum valve operating time period of the actuator is less than the crank angle corresponding to the target intake air quantity, and selects the intake valve closure timing on the compression stroke when the crank angle corresponding to the minimum valve operating time period of the actuator is greater than or equal to the crank angle corresponding to the target intake air quantity, and
        a sixth section that outputs a control signal representing the intake valve closure timing selected by the fifth section to the actuator.

2. An intake air quantity control apparatus as claimed in claim 1, wherein the intake valve closure timing on the intake stroke is retrieved from a preprogrammed map on the basis of the target intake air quantity.

3. An intake air quantity control apparatus as claimed in claim 2, wherein the intake valve closure timing on the intake stroke varies in a retard direction from a top dead center of the intake stroke with an increase of the target intake air quantity.

4. An intake air quantity control apparatus as claimed in claim 1, wherein the intake valve closure timing on the intake stroke is retrieved from a preprogrammed map on the basis of the target intake air quantity and the engine speed.

5. An intake-air quantity control apparatus for an internal combustion engine with a variable valve timing system associated with an intake valve, comprising:
    an intake-valve side actuator adjusting an opening of the intake valve;
    a control unit configured to be electronically connected to the intake-valve side actuator, for controlling the opening timing of the intake valve, and for controlling an intake-air quantity of air entering an engine cylinder on the basis of an intake valve closure timing of the intake valve; said control unit comprising
        (1) a target intake-air quantity arithmetic-calculation section which calculates a target intake-air quantity on the basis of engine operating conditions including an accelerator opening and engine speed,
        (2) an intake valve closure timing arithmetic-calculation section which calculates both an intake valve closure timing on an intake stroke and an intake valve closure timing on a compression stroke, on the basis of the target intake-air quantity and the engine speed of the engine operating conditions,
        (3) a valve operating time period arithmetic-calculation section which calculates an operating time period of the intake valve from an intake valve open timing to an intake valve closure timing, on the basis of the engine speed of the engine operating conditions,
        (4) a comparator which compares an intake-valve operating crank angle corresponding to the operating time period of the intake valve with an intake-valve operating crank angle corresponding to the target intake-air quantity,
        (5) a valve-closure-timing selection section which selects the intake valve closure timing on the intake stroke when the intake-valve operating crank angle corresponding to the operating time period of the intake valve is less than the intake-valve operating crank angle corresponding to the target intake-air quantity, and selects the intake valve closure timing on the compression stroke following the intake stroke when the intake-valve operating crank angle corresponding to the operating time period of the intake valve is greater than or equal to the intake-valve operating crank angle corresponding to the target intake-air quantity, and
        (6) a valve closure timing control section which outputs a control signal to the intake-valve side actuator to close the intake valve at the intake valve closure timing selected by said valve-closure-timing selection section.

6. The intake-air quantity control apparatus as set forth in claim 5, wherein the variable valve timing system is associated with an exhaust valve as well as the intake valve, and which further comprises an exhaust-valve side actuator adjusting an opening timing of the exhaust valve, and wherein each of the intake-valve side actuator and the exhaust-valve side actuator comprises an electromagnetic actuator.

7. In an electronically-controlled internal combustion engine with a variable valve timing system associated with an intake valve, and having an intake-valve side actuator adjusting an opening of the intake valve, an intake-air quantity control system configured to be electronically connected to the intake-valve side actuator, for controlling the opening timing of the intake valve and for controlling an intake-air quantity of air entering an engine cylinder on the basis of an intake valve closure timing of the intake valve, comprising:

(1) a target intake-air quantity arithmetic-calculation means for calculating a target intake-air quantity on the basis of engine operating conditions including an accelerator opening and engine speed, (2) an intake valve closure timing arithmetic-calculation means for calculating both an intake valve closure timing on an intake stroke and an intake valve closure timing on a compression stroke, on the basis of the target intake-air quantity and the engine speed of the engine operating conditions, (3) a valve operating time period arithmetic-calculation means for calculating an operating time period of the intake valve from an intake valve open timing to an intake valve closure timing, on the basis of the engine speed of the engine operating conditions, (4) a comparing means for comparing an intake-valve operating crank angle corresponding to the operating time period of the intake valve with an intake-valve operating crank angle corresponding to the target intake-air quantity, (5) a valve-closure-timing selection means for selecting the intake valve closure timing on the intake stroke when the intake-valve operating crank angle corresponding to the operating time period of the intake valve is less than the intake-valve operating crank angle corresponding to the target intake-air quantity, and for selecting the intake valve closure timing on the compression stroke following the intake stroke when the intake-valve operating crank angle corresponding to the operating time period of the intake valve is greater than or equal to the intake-valve operating crank angle corresponding to the target intake-air quantity, and (6) a valve closure timing control means for outputting a control signal to the intake-valve side actuator to close the intake valve at the intake valve closure timing selected by said valve-closure-timing selection means.

8. The intake-air quantity control system as claimed in claim 7, the variable valve timing system is associated with an exhaust valve as well as the intake valve, and has an exhaust-valve side actuator adjusting an opening timing of the exhaust valve, and wherein each of the intake-valve side actuator and the exhaust-valve side actuator comprises an electromagnetic actuator.

9. A method for controlling an intake-air quantity of air entering an engine cylinder for a computer-controlled internal combustion engine with a variable valve timing system associated with an intake valve, and having an intake-valve side actuator adjusting an opening of the intake valve, and an intake-air quantity control system configured to be electronically connected to the intake-valve side actuator, for controlling the opening timing of the intake valve and for controlling the intake-air quantity of air entering the engine cylinder on the basis of an intake valve closure timing of the intake valve, the method comprising:

arithmetically calculating a target intake-air quantity on the basis of engine operating conditions including an accelerator opening and engine speed, arithmetically calculating both an intake valve closure timing on an intake stroke and an intake valve closure timing on a compression stroke, on the basis of the target intake-air quantity and the engine speed of the engine operating conditions, arithmetically calculating an operating time period of the intake valve from an intake valve open timing to an intake valve closure timing, on the basis of the engine speed of the engine operating conditions, comparing an intake-valve operating crank angle corresponding to the operating time period of the intake valve with an intake-valve operating crank angle corresponding to the target intake-air quantity, selecting the intake valve closure timing on the intake stroke when the intake-valve operating crank angle corresponding to the operating time period of the intake valve is less than the intake-valve operating crank angle corresponding to the target intake-air quantity, selecting the intake valve closure timing on the compression stroke following the intake stroke when the intake-valve operating crank angle corresponding to the operating time period of the intake valve is greater than or equal to the intake-valve operating crank angle corresponding to the target intake-air quantity, and outputting a control signal to the intake-valve side actuator to close the intake valve at the intake valve closure timing selected.

10. The method as claimed in claim 8, wherein either one of the intake valve open timing and a top dead center on the intake stroke is used in arithmetically calculating both the intake valve closure timing on the intake stroke and the intake valve closure timing on the compression stroke.

11. An intake air quantity control apparatus for an engine, comprising:

an actuator associated with an intake valve; and a control unit that controls the actuator, the control unit including, a first section that calculates a target intake air quantity on the basis of an engine operating condition, a second section that calculates a crank angle corresponding to a minimum valve operating time period of the actuator from an open timing to a closure timing of the intake valve on the basis of an engine speed, a third section that calculates a closure timing of the intake valve corresponding to the target intake air quantity on either one of an intake stroke and a compression stroke on the basis of the crank angle corresponding to the minimum valve operating time period of the actuator, and a fourth section that outputs a control signal representing the closure timing so that the intake valve is caused to be closed at the closure timing calculated in the third section.

12. An intake air quantity control apparatus as claimed in claim 11, wherein the third section calculates the closure timing of the intake valve on the compression stroke when the crank angle corresponding to the minimum valve operating time period is greater than or equal to a crank angle corresponding to the target intake air quantity from an open timing of the intake valve to a closure timing of the intake valve on the intake stroke.

13. An intake air quantity control apparatus as claimed in claim 12, wherein the third section calculates the closure timing of the intake valve on the intake stroke when the crank angle corresponding to the minimum valve operating time period is less than the crank angle corresponding to the target intake air quantity from the open timing of the intake valve to the closure timing of the intake valve on the intake stroke.

14. An intake air quantity control apparatus as claimed in claim 11, wherein the third section calculates the closure timing of the intake valve on the intake stroke when the crank angle corresponding to the minimum valve operating time period is less than a crank angle corresponding to the target intake air quantity from an open timing of the intake valve to a closure timing of the intake valve on the intake stroke.

15. An intake air quantity control apparatus as claimed in claim 11, wherein the closure timing of the intake valve on the intake stroke is retrieved from a preprogrammed map on the basis of the target intake air quantity.

16. An intake air quantity control apparatus as claimed in claim 15, wherein the closure timing of the intake valve on the intake stroke varies in a retard direction from a top dead center of the intake stroke with an increase of the target intake air quantity.

17. An intake air quantity control apparatus as claimed in claim 11, wherein the closure timing of the intake valve on the intake stroke is retrieved from a preprogrammed map on the basis of the target intake air quantity and the engine speed.

18. An intake air quantity control apparatus as claimed in claim 17, wherein the preprogrammed map is set on the basis of either one of a top dead center of the intake stroke and an opening timing of the intake valve.

19. An intake air quantity control apparatus as claimed in claim 11, wherein the closure timing of the intake valve on the compression stroke is retrieved from a preprogrammed map on the basis of the target intake air quantity.

20. An intake air quantity control apparatus as claimed in claim 19, wherein the closure timing of the intake valve on the compression stroke varies in an advance direction toward a top dead center of the intake stroke with an increase of the target intake air quantity.

21. An intake air quantity control apparatus as claimed in claim 11, wherein the closure timing of the intake valve on the compression stroke is retrieved from a preprogrammed map on the basis of the target intake air quantity and the engine speed.

22. An intake air quantity control apparatus as claimed in claim 21, wherein the preprogrammed map is set on the basis of either one of a top dead center of the intake stroke and an opening timing of the intake valve.

23. An intake air quantity control apparatus as claimed in claim 13, wherein the open timing of the intake valve varies in an advance direction from a top dead center of the intake stroke with an increase of the engine speed.

24. An intake air quantity control apparatus as claimed in claim 11, wherein the actuator comprises an electromagnetic coil, and the intake valve is electromagnetically actuated by the actuator.

25. An intake air quantity control apparatus as claimed in claim 11, further comprising an actuator associated with an exhaust valve, and wherein the actuator associated with the exhaust valve comprises an electromagnetic coil, and the exhaust valve is electromagnetically actuated.

26. An intake air quantity control apparatus as claimed in claim 25, wherein an open timing of the exhaust valve is set nearby a bottom dead center of an exhaust stroke.

27. An intake air quantity control apparatus as claimed in claim 25, wherein a closure timing of the exhaust valve varies in a retard direction from a top dead center of the intake stroke with an increase of the engine speed.

28. An intake air quantity control apparatus as claimed in claim 1, wherein the actuator comprises an electromagnetic coil, and the intake valve is electromagnetically actuated by the actuator.

29. An intake air quantity control apparatus as claimed in claim 1, further comprising an actuator associated with an exhaust valve, and wherein the actuator associated with the exhaust valve comprises an electromagnetic coil, and the exhaust valve is electromagnetically actuated.

30. An intake air quantity control apparatus as claimed in claim 29, wherein an exhaust valve open timing is set nearby a bottom dead center of an exhaust stroke.

31. An intake air quantity control apparatus as claimed in claim 29, wherein an exhaust valve closure timing varies in a retard direction from a top dead center of the intake stroke with an increase of the engine speed.

32. An intake air quantity control apparatus as claimed in claim 4, wherein the preprogrammed map is set on the basis of either one of a top dead center on the intake stroke and the opening timing of the intake valve.

33. An intake air quantity control apparatus as claimed in claim 1, wherein the intake valve closure timing on the compression stroke is retrieved from a preprogrammed map on the basis of the target intake air quantity.

34. An intake air quantity control apparatus as claimed in claim 33, wherein the intake valve closure timing on the compression stroke varies in an advance direction toward a top dead center of the intake stroke with an increase of the target intake air quantity.

35. An intake air quantity control apparatus as claimed in claim 1, wherein the intake valve closure timing on the compression stroke is retrieved from a preprogrammed map on the basis of the target intake air quantity and the engine speed.

36. An intake air quantity control apparatus as claimed in claim 35, wherein the preprogrammed map is set on the basis of either one of a top dead center on the intake stroke and an opening timing of the intake valve.

37. An intake air quantity control apparatus as claimed in claim 1, wherein the intake valve open timing varies in an advance direction from a top dead center of the intake stroke with an increase of the engine speed.

* * * * *